United States Patent
Chance et al.

(10) Patent No.: US 10,523,047 B2
(45) Date of Patent: Dec. 31, 2019

(54) AUTONOMOUS ROVS WITH OFFSHORE POWER SOURCE THAT CAN RETURN TO RECHARGE

(71) Applicant: Oceaneering International, Inc., Houston, TX (US)

(72) Inventors: Thomas Chance, Lafayette, LA (US); Kevin Francis Kerins, The Woodlands, TX (US); Christopher S. Mancini, Houston, TX (US); Peter Andrew Robert Moles, Cypress, TX (US)

(73) Assignee: Oceaneering International, Inc., Houston, TX (US)

( * ) Notice: Subject to any disclaimer, the term of this patent is extended or adjusted under 35 U.S.C. 154(b) by 182 days.

(21) Appl. No.: 15/462,531

(22) Filed: Mar. 17, 2017

(65) Prior Publication Data
US 2017/0271916 A1    Sep. 21, 2017

Related U.S. Application Data

(63) Continuation-in-part of application No. 15/217,797, filed on Jul. 22, 2016.

(60) Provisional application No. 62/437,793, filed on Dec. 22, 2016, provisional application No. 62/310,478, filed on Mar. 18, 2016, provisional application No. 62/179,759, filed on Jun. 24, 2015.

(51) Int. Cl.
| | | |
|---|---|---|
| *H02J 9/06* | (2006.01) | |
| *B63B 35/44* | (2006.01) | |
| *H02J 7/00* | (2006.01) | |
| *H02J 7/34* | (2006.01) | |
| *H02J 7/35* | (2006.01) | |

(52) U.S. Cl.
CPC .............. *H02J 9/061* (2013.01); *B63B 35/44* (2013.01); *H02J 7/0027* (2013.01); *H02J 7/0045* (2013.01); *H02J 7/34* (2013.01); *H02J 7/35* (2013.01); *B63B 2035/4433* (2013.01); *H02J 2007/0096* (2013.01)

(58) Field of Classification Search
CPC .. H02J 9/061; H02J 7/0045; H02J 7/34; H02J 7/35; H02J 2007/0096; B63B 21/29; B63B 22/04; B63B 35/44; B63B 2035/4433; B63B 2035/4466; E21B 41/0027; H04B 3/58; H04B 11/00; Y02E 10/38
USPC ........................................ 307/9.1
See application file for complete search history.

(56) References Cited

U.S. PATENT DOCUMENTS

2007/0024234 A1*  2/2007  Potter ................... B63G 8/001
                                                          320/104

* cited by examiner

*Primary Examiner* — Carlos Amaya
(74) *Attorney, Agent, or Firm* — Maze IP Law, P.C.

(57) ABSTRACT

A resident remotely operated vehicle may be deployed subsea by deploying a remotely operated vehicle (ROV) (200) configured to be disposed and remain resident subsea for an extended time where the ROV comprises an ROV electrical power connector port (202) to be operatively connected to an electrical power supply (700) dedicated to the ROV. An RTMS configured to be disposed subsea for an extended time is also deployed subsea (210), typically proximate the ROV. A subsea docking hub subsea is also deployed subsea proximate the RTMS and operatively connected to the ROV and the RTMS. In addition, an umbilical is connected from the subsea docking hub to a subsea structure and a signal supplied from the subsea structure to the ROV.

19 Claims, 7 Drawing Sheets

AUTONOMOUS ROVS WITH OFFSHORE POWER SOURCE THAT CAN RETURN TO RECHARGE

RELATION TO OTHER APPLICATIONS

This application is a continuation-in-part of U.S. patent application Ser. No. 15/217,797 filed Jul. 22, 2016 and claims the benefit of U.S. Provisional Patent Application 62/437,793 titled "Rechargable Autonomous ROV With An Offshore Power Source" filed on Dec. 22, 2016, of U.S. Provisional Patent Application 62/310,478 titled "Rechargable Autonomous ROV With An Offshore Power Source" filed on Mar. 18, 2016, and of U.S. Provisional Patent Application 62/196,759 titled "Rechargable Resident ROV Power Hub" filed on Jun. 24, 2015.

FIELD OF THE INVENTION

Many offshore oilfields comprise multiple subsea wells spread out over a large area. These wells are typically clustered together in groups and tied back to a central production platform such as a floating vessel located near an oil platform (a floating production storage and offloading vessel or FPSO) via subsea umbilicals that provide power and data conduits for controlling and monitoring the wells remotely. These well clusters can be multiple miles from the production platform.

Due to the large separation distance between wells and production platform, any maintenance or repair must be carried out using some form of in-field support vessel. This work almost always involves the use of a remotely operated vehicle (ROV) installed on the vessel.

In-field support vessels are expensive to operate and are frequently unable to work due to adverse weather conditions. If work is required in multiple locations simultaneously, then more than one vessel is required.

The challenge is to provide an alternative to in-field support vessels that is more cost-effective and can work regardless of weather conditions.

FIGURES

The figures supplied herein illustrate various embodiments of the invention.

DESCRIPTION OF VARIOUS EMBODIMENTS

Figure 1:
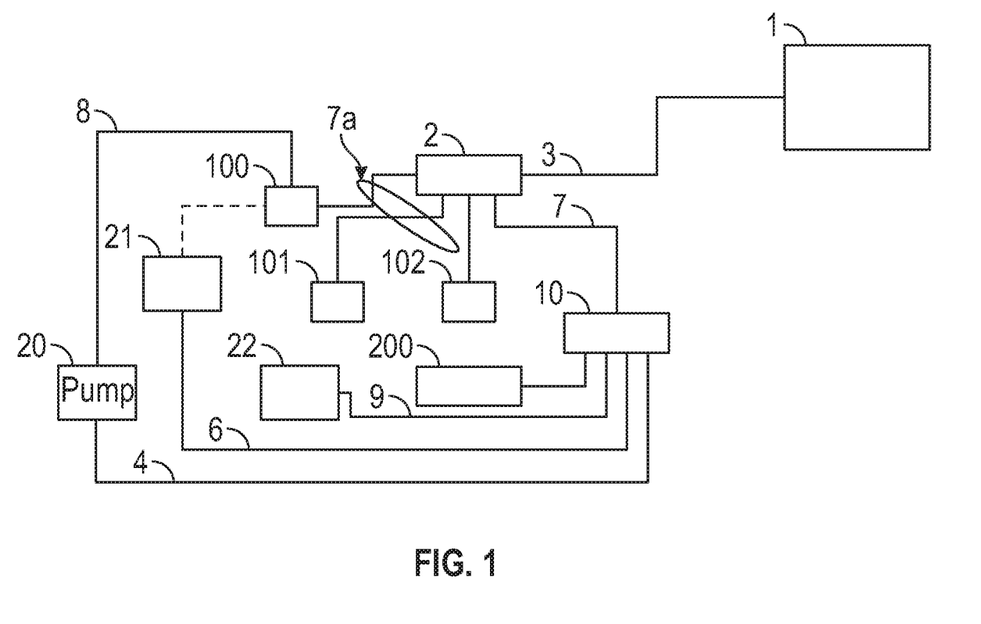
FIG. 1 is a block schematic diagram of an exemplary embodiment of the claimed invention.

Referring to FIG. 1, in a first embodiment a subsea umbilical and signal distribution hub (SDH) system comprises signal source 1, signal carrier 7 operatively in communication with the signal source 1, and SDH 10. As used herein, "signal" may be a power signal, a data signal, or the like, or a combination thereof, including electromagnetic signals and optical signals.

SDH 10 may be gravity-based, or affixed to the seabed via pin pile. As more fully described herein below, in embodiments SDH 10 comprises one or more power/data receptacles for connecting to subsea devices; one or more power/data receptacles which may be configured to accept either jumper leads for routing power/data to remote devices or directly-mounted devices or the like; electrical power switching and management controls; data switching and management controls; and/or one or more acoustic transceivers for communicating with subsea positioning equipment, e.g. acoustic transponders, acoustic modems, and the like, or a combination thereof.

Figure 2:
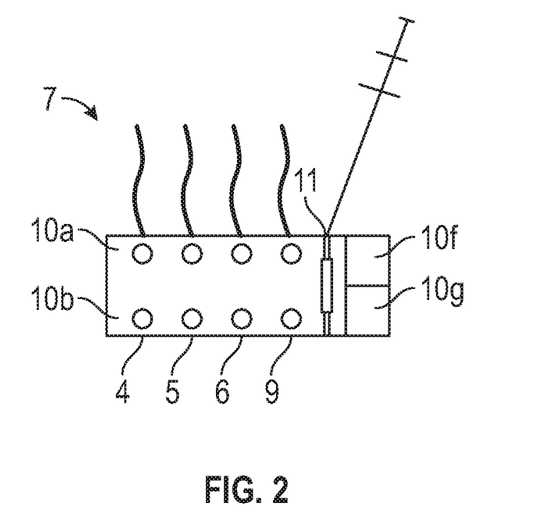
FIG. 2 is a block diagram of a signal distribution hub comprising a plurality of inputs and outputs.

Referring additionally to FIG. 2, SDH 10 typically comprises one or more signal input connectors 10a operatively in communication with one or more signal carriers 7 and one or more signal output connectors 10b operatively in communication with at least one signal input connector 10a. In embodiments signal output connector 10b comprises a plurality of such signal output connectors, where each signal output connector 10b of the plurality of signal output connectors is typically operatively in communication with one or more signal input connectors 10a and further adapted to be connected to one or more signal output carriers such as signal carriers 4,5,6, and 9.

Referring back to FIG. 1, signal source 1 may comprise a power signal source, a data signal source, or the like, or a combination thereof. If a power signal source is present, the power signal source may comprise platform based power source 1a (FIG. 3), buoy-based power source 1b (FIG. 3), shore-based power source 1c (FIG. 3), or the like, or a combination thereof.

Buoy-based power sources 1b (FIG. 3) may comprise one or more single or dual/redundant power generation systems 1d (FIG. 3) that can be easily refueled by a vessel of opportunity and may further comprise one or more data transmitters 1e (FIG. 3) configured to communicate to a remote data receiver, such as a platform or shore based data receiver. Data transmitters 1e may communicate via satellite or cellular communications or the like.

Signal input connector 10a may be configured to accept a jumper lead, such as signal carrier 7, for routing power to a remote device such as RROV 200 and/or a directly-mounted device. Additionally, signal output connector 10b may be configured to provide a signal received via the signal carrier 7 to a subsea device, by way of example and not limitation such as via signal carrier 5 to subsea pump 20.

Where SDH 10 is configured to receive and distribute a power signal, SDH 10 may further comprise signal switch 10f (FIG. 2) configured as an electrical power switch and signal manager 10g (FIG. 2) configured as a power manager operatively disposed intermediate signal input connector 10a and signal output connector 10b.

Where SDH 10 is configured to receive and distribute a data signal, e.g. from data source 1a, SDH 10 may further comprise one or more signal input connector 10a configured as input data connectors operatively in communication with signal source 1a configured as a data source and one or more output signal output connectors 10b configured as data connectors operatively in communication with input data connector 10a. Additionally, in this embodiment SDH 10 may further comprise signal switch 10f (FIG. 2) configured as a data switch and signal manager 10g (FIG. 2) configured as a data manager operatively disposed intermediate signal input connector 10a and signal output connector 10b.

Referring back to FIG. 1, in a further embodiment, umbilical terminator 2, which may be a pre-existing umbilical terminator assembly, may be present, operatively in communication with signal source 1 and have pre-existing umbilical connections to subsea equipment and wells such as via umbilical 7a, and disposed intermediate signal source 1 and SDH 10 signal input connector 10a. Typically, in this embodiment signal carrier 7 is operatively in communication with umbilical terminator 2 and, accordingly, with signal source 1 via umbilical terminator 2 and umbilical terminator 2 is operative to provide a signal received from signal source 1 to SDH 10 signal input connector 10a via signal carrier 7. By way of example and not limitation, signal source 1 may provide a signal to umbilical terminator 2 via umbilical 3 and then that signal received at umbilical terminator 2 may be provided to SDH 10 signal input connector 10a via signal carrier 7 where signal carrier 7 is operatively connected to umbilical terminator 2.

Figure 3:
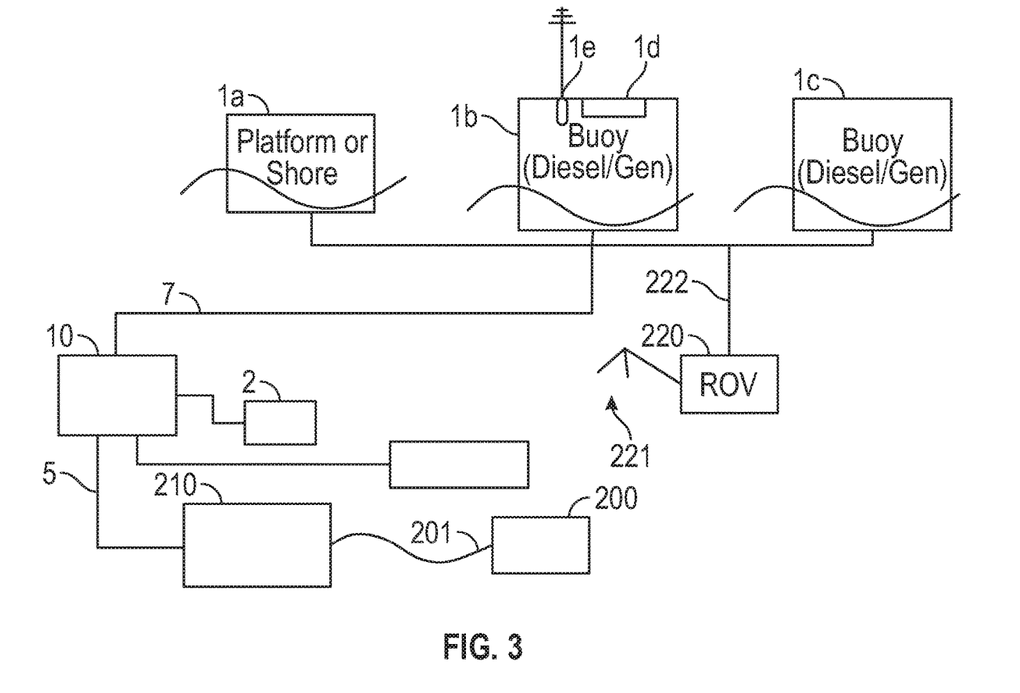
FIG. 3 is a block schematic diagram of a further exemplary embodiment of the claimed invention.

In other embodiments, referring generally to FIG. 3, signal carrier 7 is dedicated to SDH 10 and completely isolated from another umbilical such as umbilical 3 which may be used to control and/or monitor a well 100.

In certain embodiments SDH 10 further comprises transceiver 11 (FIG. 2), which may be an acoustic transceiver, operatively in communication with SDH 10.

Figure 7:
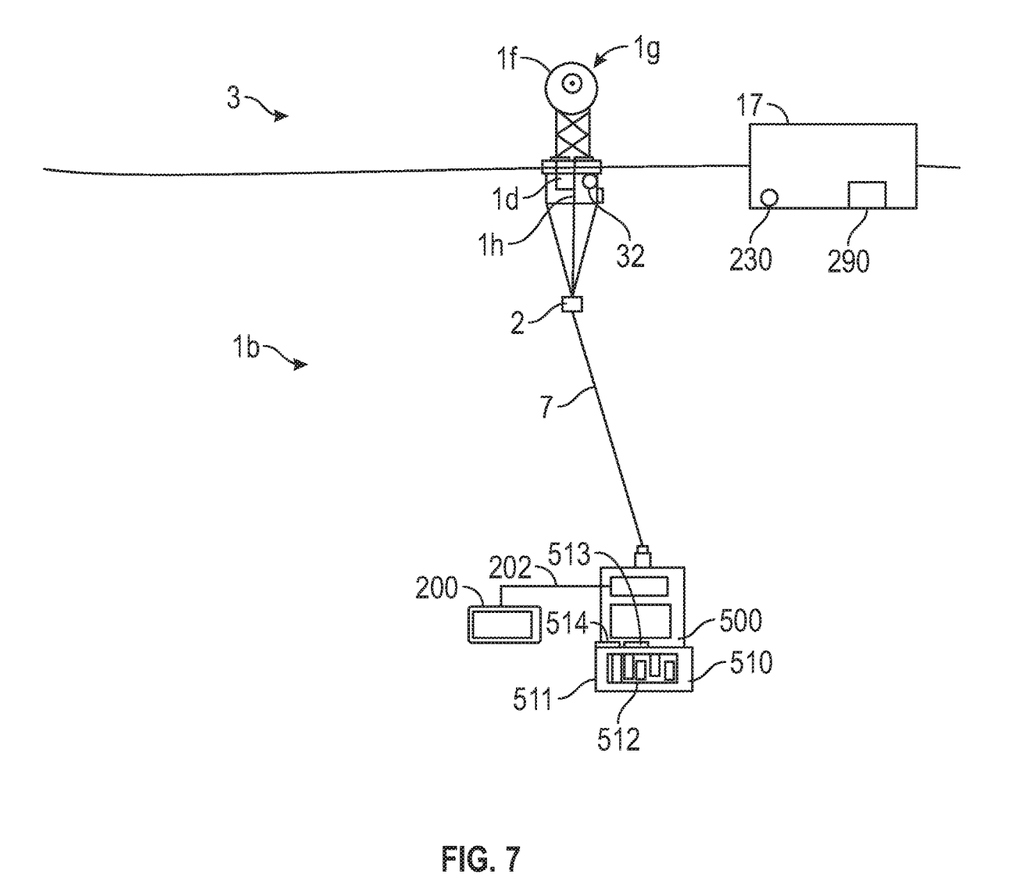
FIGS. 7-9 are diagrammatic illustrations of a exemplary buoy-based power systems.

In a further embodiment, referring now to FIG. 7, subsea power system 1b comprises one or more surface buoys 3 and one or more subsea battery banks 510 operatively coupled to each other to allow provision of electrical power from one or more surface buoys 3 to external equipment.

In certain embodiments, vehicle 200, e.g. an ROV, AUV, or surface vehicle such as an autonomous surface vehicle (ASV) may be present and comprises vehicle power inlet 202 configured to cooperatively interface with subsea battery bank 510 such as via second power outlet 514.

Figure 9:
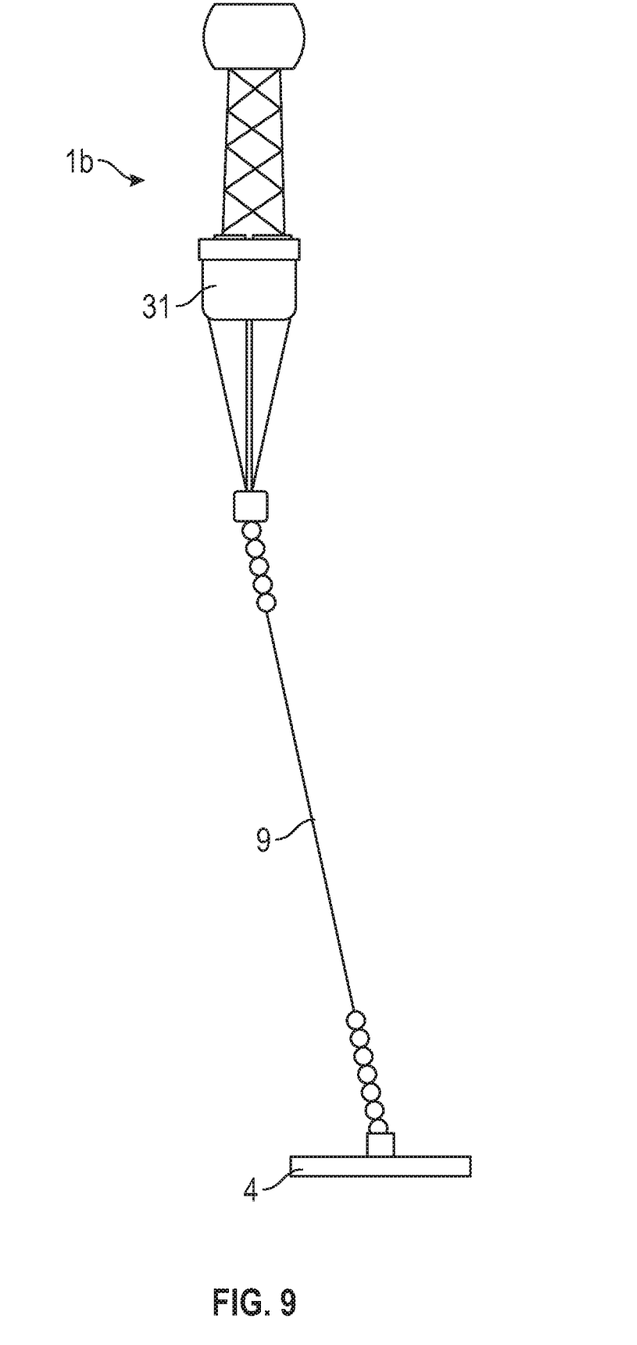

Subsea power system 1b typically comprises controller 32, electrical power generator 1d, and surface buoy power outlet 1h operatively in communication with electrical power generator 1d, all of which are typically housed at least partially in housing 31 (FIG. 9). Electrical power generator 1d may comprise a diesel power generator, solar cells, fuel cells, wave generators, wind turbines, or the like, or a combination thereof.

Subsea battery banks 510 typically comprise one or more subsea battery bank power inlets 513 operatively in communication with an associated surface buoy power outlet 1h and with an associated battery bank 512, which may comprise one or more rechargeable subsea batteries 512, and one or more subsea battery bank power outlets 514, each of which is associated with at least one battery bank 512. These components are typically housed in housing 500.

In certain embodiments, surface buoy 3 further comprises radar 1g which is disposed within radome 1f.

Control umbilical 7 may also be present and deployed and operatively in communication between surface buoy 3 and a predetermined seabed location. Additionally, counterweight 2 may be deployed, e.g. along control umbilical 7 or intermediate control umbilical 7 and surface buoy 3 and configured to minimize roll and maximize vertical displacement of radome 1f with respect to a water surface.

Figure 8:
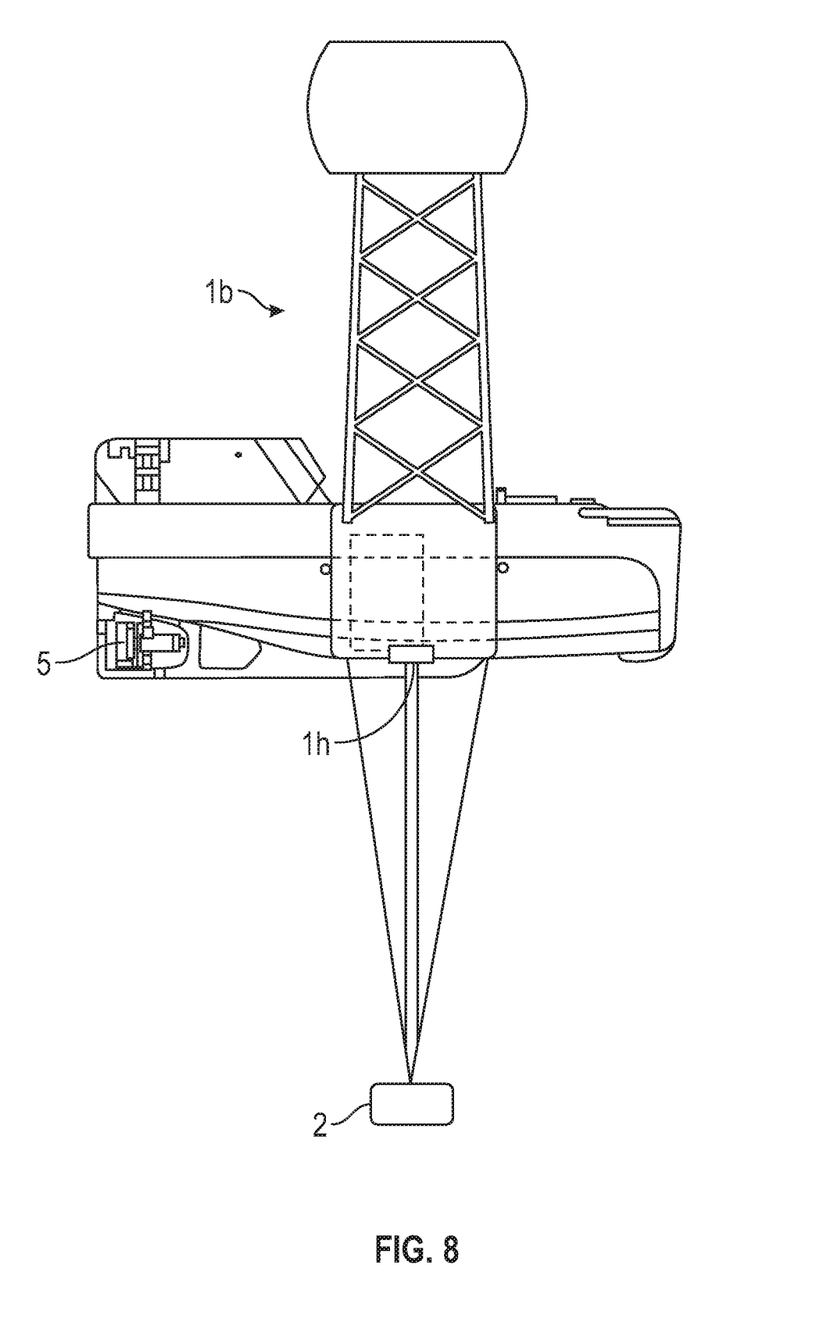

Referring additionally to FIG. 8, in embodiments surface buoy 3 further comprises one or more thrusters 5, which may be electrically and/or hydraulically powered thrusters, capable of operating in dynamic positioning mode to hold a position when surface buoy 3 is deployed on a body of water.

Referring additionally to FIG. 9, in certain embodiments surface buoy 3 is configured to be moored to a seabed such as via anchor 4 (FIG. 9) and cable 9 (FIG. 9).

Figure 10:
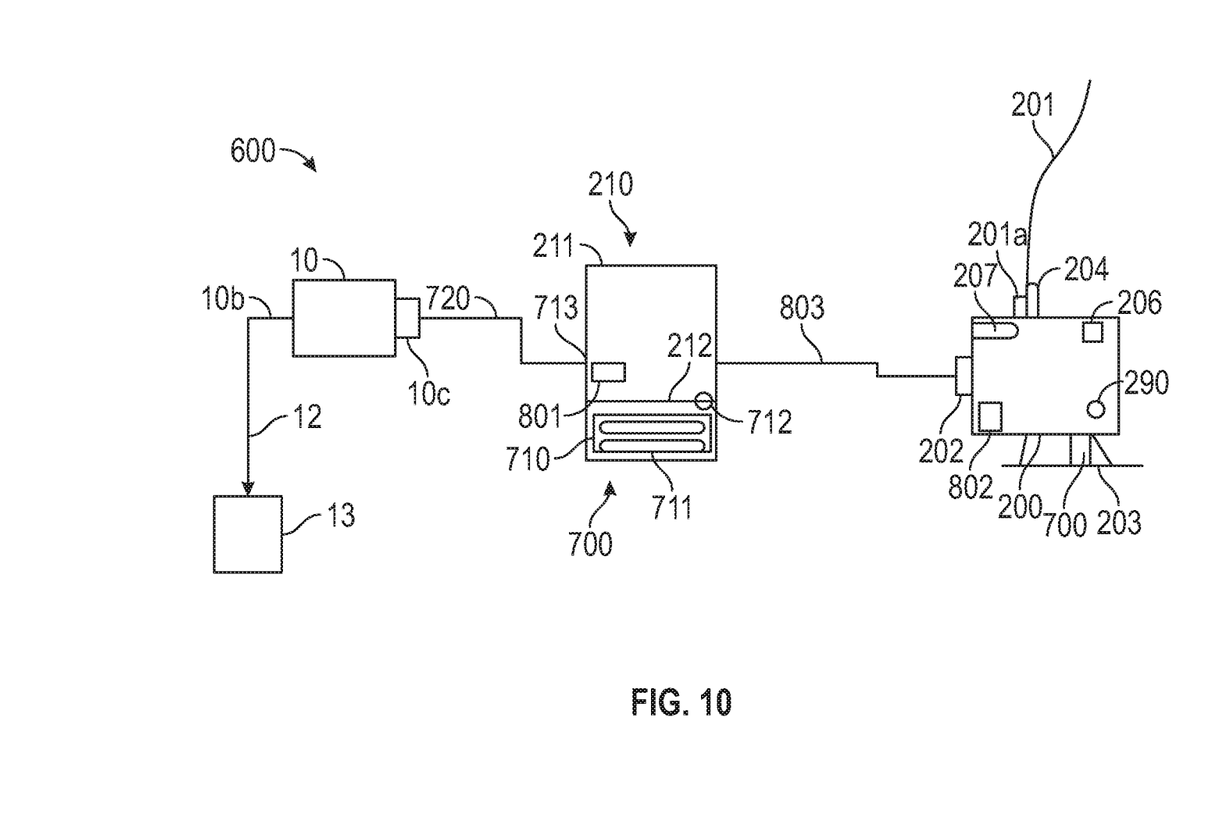
FIG. 10 is a block diagram of an exemplary resident ROV system.

Referring now to FIG. 10, in a further embodiment, resident remotely operated vehicle (RROV) system 600 comprises one or more remotely operated vehicles 200 (ROV) configured to be disposed subsea for an extended time, each ROV 200 comprising ROV controller 207, ROV electrical power connector port 202; one or more electrical power supplies 700 dedicated to each such ROV 200; and one or more ROV cages or, equivalently, resident tether management systems (RTMS) 210 configured to be disposed subsea for an extended time.

Electrical power supply 700 typically comprises housing 710, which is configured and constructed of a material sufficient for extended use subsea, one or more power sources 711 having electrical capacity sufficient to power and associated ROV 600 for a predetermined time, and electrical power supply outlet 712 operatively connected to power source 711 and configured to be selectively operably engagable with ROV electrical power connector port 202. In embodiments, power source 711 may comprise one or more rechargeable batteries, one or more fuel cells, or the like, either alone or in combination.

In embodiments, RTMS 210 comprises one or more RTMS power supplies 211, where at least one, if not each, RTMS power supply 211 is operatively in communication with cage power supply power outlet 212 which is configured to be selectively and operatively connected to electrical power supply outlet 712. In embodiments, RTMS power supplies 211 may comprise one or more rechargeable batteries, one or more fuel cells, or the like, either alone or in combination. In other embodiments, electrical power supply 700 augments or is otherwise part of, in whole or in part, RTMS power supply 211.

In contemplated embodiments electrical power supply 700 may further comprise skid 203 operatively connected to ROV 200. In such embodiments, electrical power supply 700 typically comprises electrical capacity sufficient to power ROV 200 for a predetermined time.

Data transceiver 206 may be present and operatively in communication with operators located onshore, on a platform, or an FPSO.

In certain embodiments, RROV system 600 further comprises one or more subsea docking hubs 10 which comprise signal connector port 10b operatively in communication with subsea structure 13 which is operatively in communication with a surface structure such as, by way of example and not limitation, a vessel, a platform, a rig, a shore based facility, or the like, or a combination thereof. Subsea docking hub signal connector port 10b may comprise a power signal connector port, a data signal connector port, or the like, or a combination thereof.

Umbilical 201 may be present and configured to supply a data and/or power signal to ROV 200 and be operatively disposed intermediate signal docking hub 10 and subsea structure 13. In such embodiments, RTMS 210 may further comprise a signal connector 10c operatively in communication with umbilical 201, where signal connector 10c and may comprise a wet mate power and/or data connector.

In contemplated embodiments, ROV 200 may be configured to operate as either a conventional tethered ROV or as an ROV which is also able to be coupled/decoupled from a tether such as umbilical 201 and function as a resident autonomous underwater vehicle (RAUV) that is not coupled to a tether. When functioning as an RAUV, ROV 200 may draw power from electrical power supply 700 dedicated to ROV 200 which may be part of skid 202 which may also be mounted to ROV 200.

Where tether 201 comprises a "connect and disconnect" ability, i.e. a coupler/decoupler, tether 201 may comprise data and power connector 201a configured to provide power, data, and/or control. It may further comprise connector 204 configured to latch and unlatch tether 201 to ROV 200, where connector 204 comprises an electro-mechanical or hydraulic type collet connector.

Each ROV 200 and RTMS 210 may further comprise one or more power management systems, illustrated at 801,802, which may further be operatively in communication with computer 803 which itself may be deployed subsea or at a surface location.

In the operation of exemplary embodiments, SDH 10 typically operates as a subsea signal hub to provide a signal pathway to RROV 200 and/or other devices that reside permanently at or proximate to well cluster 100-102. As discussed below, SDH 10 may also be used for other purposes, including signal communications to and from RROV 200, an autonomous underwater vehicle (not shown in the figures), and/or a hybrid system (not shown in the figures); powering high-power subsea devices and systems such as dredge unit 22, systems 21 which can be flow assurance systems such flowline remediation and well stimulation systems or systems which comprise asset integrity equipment, and/or various subsea pumping and injections systems such as pump 20; and/or providing emergency power/data to one or more subsea wells 100-102 in the event of failure of the primary control umbilical such as by using a secondary source.

Referring generally to FIGS. 3-6, in a first operative embodiment, a signal may be provided to a subsea device such as pump 20, subsea dredge 22, RROV 200, wells 100-102, or the like, or a combination thereof, via SDH 10, which is as described above, by disposing SDH 10 subsea and disposed SDH umbilical 7 proximate to a seafloor. SDH 10 may be affixed to the seabed via a pin pile or the like.

SDH umbilical 7, which may be dedicated to SDH 10 or connected to SDH 10 from another device such as umbilical terminator 2, operatively connects SDH 10 to signal source 1, directly or indirectly, and SDH signal output connector 10b is made available for connection to a subsea device such as RROV 200, an autonomous underwater vehicle (not shown in the figures), a hybrid system (not shown in the figures), a high-power subsea device such as high-power subsea dredge unit 22, a subsea pump 20, a subsea injections system, and/or one or more systems 21 such as a flow assurance system or an asset integrity equipment 21, or the like, or a combination thereof RROV 200 may be an RROV residing permanently at or proximate to well cluster 100-102.

Once connected, a signal may be received from signal source 1, where, as noted before, the signal comprises a power signal and/or a data signal, and the received signal provided to the subsea device via one or more SDH signal output connectors 10b.

In certain embodiments, SDH 10 may be used to provide emergency power/data to well 100-102 in the event of failure of a primary control umbilical.

Referring to FIG. 1, in an embodiment power and control may be accessed from an existing umbilical such as umbilical 3 using spare conductors and fibers. The signal may be provided to SDH 10 via signal carrier 7 which may comprise a flying lead 7a.

In this or other embodiments, a signal may be provided to a subsea device via SDH 10, which is as described above, by deploying a device such as ROV 200 subsea; deploying resident tether management system (RTMS) 210 (FIG. 3) which is configured to be deployed subsea and remain deployed for an extended period of time, e.g. by lowering RTMS 210, with RROV 200 installed, such as by using fast-line 401; deploying jumper 5, which may be lowered or removed, from RTMS 210; connecting jumper 5 to SDH 10 such as via ROV 220 or RROV 200; and once in place, switching the signal on at SDH 10.

RROV 200 may be used as well to connect a power and/or other umbilical such as signal carrier 4 to a subsea device from SDH 10.

Once a signal task is completed, RROV 200 may be flown out such as with a full tether; a predetermined set of RROV and RTMS function checks may be completed; and RROV 200 may be returned to RTMS 210.

In either method, a signal check, such as a communication and/or power signal check, may be performing after the signal is switched on, i.e. made available via SDH 10.

Figure 4:
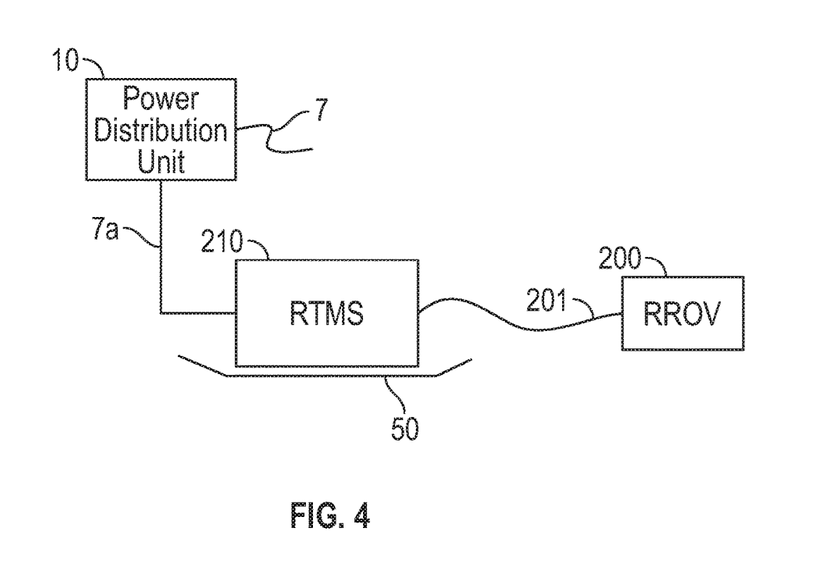
FIG. 4 is a block schematic diagram of a further exemplary embodiment of the claimed invention.
Figure 5:
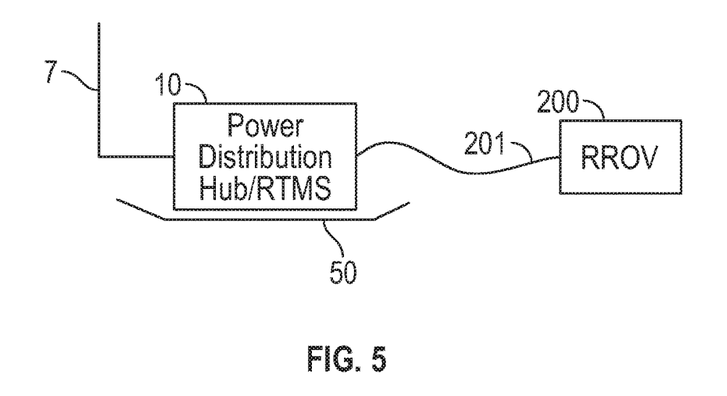
FIG. 5 is a block schematic diagram of a further exemplary embodiment of the claimed invention.

In a further embodiment, signal carrier 7 may be a dedicated subsea umbilical used with SDH 10, as illustrated in FIG. 4. Umbilical 7 may be laid on the seafloor from production platform 1a (FIG. 3) or shore 1c (FIG. 3) or the like to well cluster 100-102, where it terminates in SDH 10. In certain of these embodiments umbilical 7 may be completely isolated from those that control and monitor wells 100-102 themselves and pose little to no risk to the oil production process.

Referring to Fig. 3, in a further embodiment, dedicated signal carrier 7 which may be a subsea umbilical is provided from buoy 1b or surface 1c and connected to SDH 10. In this case as well, umbilical 7 may be completely isolated from those that control and monitor wells 100-102 themselves and pose little to no risk to the oil production process. Buoy 1b may contain a single power generation system 1d or dual/redundant power generation systems 1d that can be refueled by such as by a vessel of opportunity. Buoy 1b may further communicate to platform 1a or shore 1c such as via satellite or cellular communications.

In certain embodiments, one or more devices such as ROV 220 may be deployed subsea, such as by using fast-line 401, and RTMS 210 lowered with RROV 200 installed. RTMS 210 and RROV 200 can then be rested on the seafloor such as via mud-mat 50. One or more jumpers 5 may be lowered or removed from RTMS 210 and connected to SDH 10 with such as via ROV 220. Once in place, power and communications may be switched on at SDH 10. Optionally, communication and power checks may be performed.

As needed, RROV 200 may be flown out with full tether and RROV and RTMS function checks completed. RROV 200 may be used as well to connect a power and/or other umbilical such as 4 to a subsea device such as pump 20, subsea dredge 22, asset integrity system 21, or the like, from SDH 10.

Once connected, RROV 200 may be returned to RTMS 210 and, as needed, functions such as maintenance checks completed.

In a further embodiment, RTMS 210 may be lowered with RROV 200 installed using, e.g., ROV umbilical 222, and rested on the seafloor such as with mud-mat 50. RROV 200 may be deployed and jumper 5 lowered and/or removed from RTMS 210 and connected to SDH 10. Power and/or communications may be switched on at SDH 10 and RROV 200 returned to RTMS 210.

Once a signal such as power is available at SDH 10, that signal may be provided from SDH 10 to field internal power on RTMS 210 such as by using power switch 10f. Communication and power checks may be performed. Once the desired task, e.g. provision of power and/or data, is completed, RROV 200 may be flown out such as with a full tether 201 and RROV and RTMS function checks completed. RROV 200 may be returned to RTMS 210 and maintenance checks may be completed, e.g. recompensation and the like. A clump-on fast-line may be deployed (if not deployed with RTMS 210) and the umbilical removed from RTMS 210 and connected to the clump-on fast-line. Optionally, one or more components, e.g. RROV 200, may then be recovered to the surface.

With respect to intervention type operations, during inspection RROV 200 may be navigated to subsea hardware such as Christmas trees, manifolds, UTA 2, and the like. If so equipped, video cameras may be used to inspect the hardware for damage, corrosion or leakage. One or more tools such as electric brush tools may be used to clean surfaces as necessary and one or more used to access areas as necessary, e.g. an electric suction pump.

Figure 6:
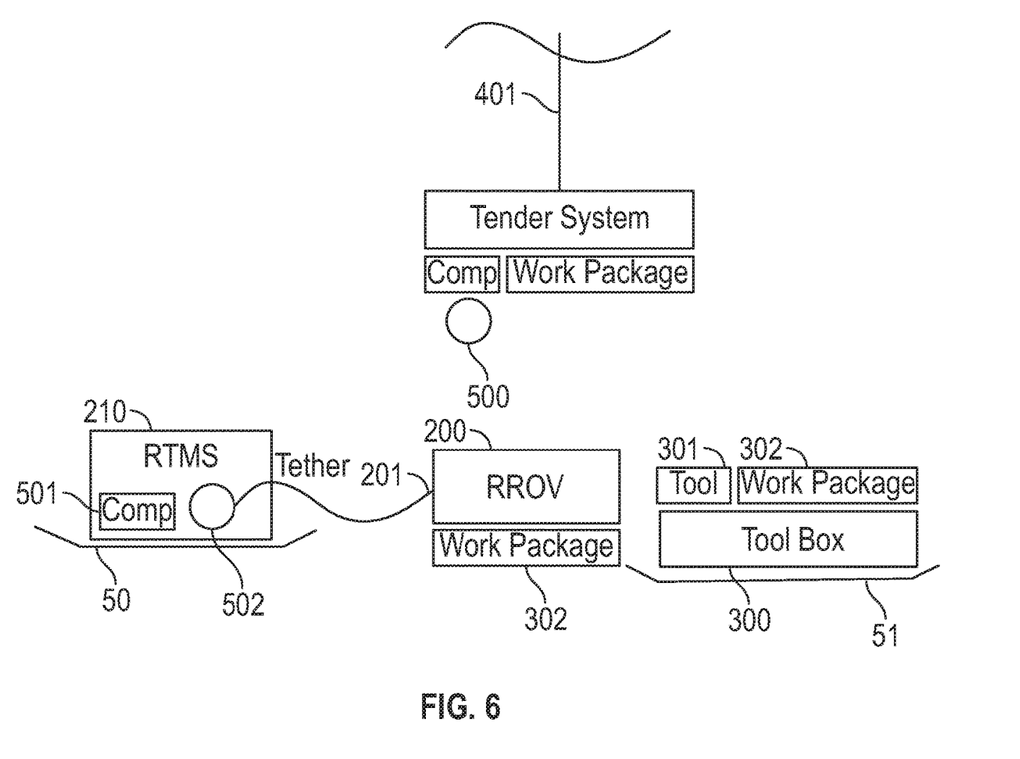
FIG. 6 is a block schematic diagram of a further exemplary embodiment of the claimed invention.

RROV 200 may be used to operate hardware valves and/or for installation of flying leads, such as by flying RROV 200 to the hardware; docking tool 301 such as an integrated electric torque tool into an appropriate receptacle; and opening and/or closing the valve as required, which may comprise counting turns, monitoring torque, and the like, or a combination thereof. As illustrated in FIG. 6, tool 301 may be part of or otherwise accessible from tool box 300 and/or part of work package 302.

RROV 200 may be used to obtain cathodic protection (CP) readings by flying RROV 200 to the hardware, placing a probe at a pre-defined location, and taking one or more readings. This may be repeated as necessary.

RROV 200 may be used for fluid injection operations by flying RROV 200 to the desired hardware, docking a hot stab tool into an appropriate receptacle; and, using an HPU on RROV 200, powering a desired tree function. Once completed, the hot stab may be removed.

Referring now to FIG. 6, RROV 200 may be used to support other tools subsea as well, such as pump 20 (FIG. 1) and/or subsea dredge 22 (FIG. 1) and/or tool 301. In an embodiment, a tool such as tool 301 may be lowered to the sea bed such as by using tool deployment frame 300 and/or a fast line 401. Alternatively, tool 301 may already be present such as in subsea tool box 300 or as part of work package 302. In such embodiments, RROV 200 acquires tool 301 and, if needed, plugs hot stab 221 (FIG. 3) into tool 301. If not at the correct location, RROV 200 flies tool 301 to a desired location. Using an HPU aboard RROV 200, tool 301 may then be operated as required. In a further tool support embodiment, for electric tools a motor driver available via RROV 200 may be used to operate tool 301 in place or alongside the HPU and, in such embodiments, RROV 200 connected to tool 301 via an appropriate electrical connector. Once the desired operation is completed, hot stab 221 is removed and the tool returned to a tool deployment frame or a subsea tool box.

Referring still to FIG. 6, in a further embodiment RROV 200 may be used to fill and/or refill one or more compensation/hydraulic reservoirs 500. In a first fill/refill embodiment, compensation and hydraulic oil refill system 500, which may be built into tool deployment frame 300, is filled such as on a deck of a vessel (not shown in the figures). Typically, tool deployment frame 300 is lowered such as to mudline 51 using fast-line 401 and a fill line connected from a bladder to an RTMS fill port. Once connected, a fill valve is opened on RTMS 210 and, using a mechanical rotary interface on RROV 200, plugged into refill system pump drive 501. Fluid is then pumped until a predetermined RTMS bladder pressure is achieved. When such pressure is achieved or it is otherwise deemed required, RROV 200 is undocked from the tool deployment frame refill pump system and the fill valve on RTMS 210 is closed.

In a second fill/refill embodiment, RROV 200 closes one or more isolation valves on an empty compensation system 502 on RTMS 210. Fast-line 401 is lowered and connected to empty compensation system 502 on RTMS 210 which is then unlocked and returned to a location such as a surface location using fast-line 401. Once at the surface, compensation system 502 is refilled and inspected for damage, wear, and the like. If it passes inspection, compensation system 502 is returned to RTMS 210 using fast line 401 and docked and locked to RTMS 210. Once docked and locked, one or more isolation valves is opened and pressures confirmed.

In the operation of a further embodiment, ROV 220 is deployed and RROV 200 ensured to be properly secured inside RTMS 210. Power and/or communications are switched off at SDH 10. Jumper 5 (FIG. 3) is disconnected from RTMS 210 and optionally stored. Fast-line 401 is lowered and connected to RTMS 210 and, once connected, RTMS 210 is recovered to a surface location.

In a further embodiment, RROV 200 may be replaced and/or changed-out subsea by flying RROV 200 outside of RTMS 210 and deploying ROV 220. Fast-line 401 is lowered and secured to RROV 200 and power and/or communications switched off at SDH 10. Tether 201 is disconnected from RROV 200 and may be recovered into RTMS 210. RROV 200 may then be recovered to the surface location.

Once any of the above operations are completed, RROV 200 may be undocked from RTMS 210.

In the operation of a further embodiment, referring now to FIGS. 7-9, electrical power may be provided to a subsea power source and/or subsea device by deploying subsea power system 1b to a location subsea and generating power at power generator 1d. The generated power may then be supplied to subsea power supply such as battery pack 500.

For surface buoy 3 which comprises one or more thrusters 5 (FIG. 8), thruster 5 may be used in dynamic positioning mode to hold a position of surface buoy 3 once surface buoy 3 is deployed on a body of water.

In addition, vehicle 200, which may be an ROV, AUV, ASV, or RAUV, may be maneuvered to a position proximate subsea battery bank 500, where vehicle 200 comprises vehicle power connector 202 which can be operatively connected to subsea battery bank power outlet 514.

In a further embodiment, referring again to FIG. 10, ROV 200 may be deployed subsea, where ROV 200 is as described above. Once ROV 200 is deployed, electrical power supply 700 may be dedicated to and operatively connected to ROV 200, where electrical power supply 700 is as described herein above. RTMS 210 may be deployed subsea as well, where RTMS 210 is as described above. Subsea docking hub 10 is typically also deployed subsea, where subsea docking hub 10 is as described above.

Once deployed, ROV 200 and RTMS 210 are typically operatively connected to subsea docking hub 10. Typically, umbilical 12 is connected from subsea docking hub 10 to subsea structure 13 and a signal, which may be a power and/or data communications signal, is supplied between subsea structure 13 and ROV 200. The signal may be supplied by operatively connecting subsea structure 13 to a surface structure such as a vessel, platform, rig, buoy, or shore base where control consoles are manned, or the like, or a combination thereof, and the signal supplied to subsea structure 13 from the surface structure such as via umbilical 12a and then on to ROV 200 and/or RTMS 210.

In certain embodiments ROV 200 is configured for operations in either a tethered ROV mode or an untethered resident autonomous underwater vehicle (RAUV) mode where ROV 200 is not coupled to ROV tether 201 and, in RAUV mode, becomes an RAUV which draws power from electrical power supply 700, by way of example and not limitation such as when electrical power supply 700 comprises skid 203 mounted to ROV 200. When operating in RAUV Mode, the RAUV is typically provided with a predetermined set of pre-programmed mission objectives to be accomplished via computer 290 which may located onboard the RAUV, by way of example and not limitation comprising navigating to one or more positions subsea, performing one or more predetermined functions at predetermined times, navigating the RAUV to RTMS 210, or the like, or a combination thereof.

The RAUV may be reconnected to ROV tether 201 such as to return to an ROV mode and/or recharge batteries. The RAUV may be navigated to a different RTMS 210 and/or signal distribution hub 10 at a location other than its originating RTMS 210 and/or signal distribution hub 10 or to a remote charging point that allows the transfer of data and recharging of batteries onboard the RAUV.

In any configuration, the amount of power delivered from subsea umbilical 201 to system 600 may vary and the actual amount of power delivered from subsea umbilical 201 to resident system 600 used to determine battery configurations and capacity. Typically, RTMS 210 and ROV 200 are fitted with batteries 711 and power management system 801,802 that allows for charging of batteries 711 and power delivery from batteries 711 to resident system 600 if the power is less than is needed for full operation of resident system 600 and associated tooling. In some embodiments, power management system 801,802 allows for charging of batteries 711 and for power delivery from batteries 711 to resident system 600 and directly from a tether.

Buoy system 1b maybe be deployed by and later provide power support to an autonomous surface vessel (ASV) such as ASV 17. By way of example and not limitation, it may be desirable to have a vehicle such as ROV 200 operating in its RAUV mode or an ASV leave a first location at a predetermined time, transit at a speed until the vehicle gets to a second location, e.g. one specified by latitude and longitude. The speed may be designated from a set of safe and fuel efficient speeds. A computer, such as computer 290 in the RAUV or ASV 17, may have access to one or more sensors 230 and timers to understand that it may have to change the speed based on current location and elapsed time. Travel time may extend to days to get to the location. Once there, the vehicle may comprise a set of functional instruction programming, e.g. (1) poll for an acoustic beacon that is on the ocean bottom; (2) when it senses the beacon, anchor the vehicle using an anchor system which is part of the vehicle; (3) once anchored, perform additional functions such as tighten an anchor line to maintain communications with the beacon; (4) during its stay proximate the beacon, monitor its position, e.g. a storm may causes the vehicle to drag its anchor, and take necessary steps if it moves too far off location, e.g. pick up its anchor and move back once the seas subside; and (5) after an elapsed time, which may be hours, days, or months, release the anchor and navigate to a further location which may be its first location.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A resident remotely operated vehicle (RROV) system, comprising:
    a. a remotely operated vehicle (ROV) configured to be disposed and remain resident subsea for an extended time, the ROV comprising an ROV electrical power connector port and an ROV controller;
    b. an electrical power supply dedicated to the ROV, the electrical power supply comprising:
        i. a housing configured for use subsea;
        ii. a power source having electrical capacity sufficient to power the ROV for a predetermined time;
        iii. an electrical power supply outlet operatively connected to the power source and configured to be selectively operably engagable with the ROV electrical power connector port;
    c. a resident tether management system (RTMS) configured to be disposed subsea for an extended time, the RTMS comprising:
        i. an RTMS power supply;
        ii. a hub signal connector; and
        iii. an RTMS power supply power outlet configured to be selectively operatively connected to the electrical power supply outlet;
    d. a subsea docking hub, comprising:
        i. a structure signal connector port; and
        ii. an RTMS signal connector port and
    e. a hub umbilical operatively in communication with the RTMS signal connector port and the hub signal connector port.

2. The resident remotely operated vehicle (RROV) system of claim 1, wherein the RTMS power supply comprises the electrical power supply.

3. The resident remotely operated vehicle (ROV) system of claim 1, wherein:
    a. the ROV comprises a skid operatively connected to the ROV;
    b. the electrical power supply is disposed within the skid; and
    c. the battery comprises electrical capacity sufficient to power the ROV for a predetermined time.

4. The resident remotely operated vehicle (RROV) system of claim 1, further comprising a data transceiver operatively in communication with an operator onshore, a vessel, or an FPSO and with the ROV controller.

5. The resident remotely operated vehicle (RROV) system of Claim 1, wherein the subsea docking hub signal connector port comprises a power signal connector port or a data signal connector port.

6. The resident remotely operated vehicle (ROV) system of claim 1, wherein the ROV is configured to operate as either:
    a. a conventional, tethered ROV comprising a connection to a surface deployed tether; or
    b. a tethered ROV configured to be selectively connected to a tether deployed from the RTMS or to be selectively disconnected from the tether and function as an autonomous underwater vehicle (AUV) that is not coupled to the tether and draws power from the electrical power supply.

7. The resident remotely operated vehicle (ROV) system of claim 6, wherein the selectively connected tether comprises:
   a. a data and power connector for power, data and control; and
   b. a connector configured to latch and unlatch the tether to the ROV.

8. The resident remotely operated vehicle (ROV) system of claim 7, wherein the connector comprises an electromechanical or hydraulic type collet connector.

9. The resident remotely operated vehicle (ROV) system of claim 1, wherein:
   a. the RTMS comprises a plurality of RTMS; and
   b. the tether comprises a length sufficient to provide coverage for a predetermined area for work.

10. The resident remotely operated vehicle (ROV) system of claim 1, wherein each of the ROV and the RTMS further comprises a power management system.

11. A method of deploying a remotely operated vehicle subsea, comprising:
    a. deploying a remotely operated vehicle (ROV) subsea, the ROV configured to be disposed and remain resident subsea for an extended time, the ROV comprising an ROV electrical power connector port;
    b. operatively connecting an electrical power supply to the ROV, the electrical power supply dedicated to the ROV, the electrical power supply comprising:
       i. a power source having electrical capacity sufficient to power the ROV for a predetermined time; and
       ii. an electrical power supply outlet operatively connected to the power source and configured to be selectively operably engagable with the ROV electrical power connector port;
    c. deploying an RTMS subsea, the RTMS configured to be disposed subsea for an extended time, the RTMS comprising:
       i. an RTMS power supply; and
       ii. an RTMS power supply power outlet configured to be selectively operatively connected to the electrical power supply outlet;
    d. deploying a subsea docking hub subsea, the subsea docking hub comprising a signal connector port operatively in communication with a subsea structure which is operatively in communication with a surface structure;
    e. operatively connecting the ROV and the RTMS to the subsea docking hub;
    f. connecting an umbilical from the subsea docking hub to a subsea structure; and
    g. supplying a signal from the subsea structure to the ROV.

12. The method of deploying a remotely operated vehicle subsea of claim 11, wherein supplying the signal comprises:
    a. operatively connecting the subsea structure to a surface structure or shore base where a control console is manned;
    b. supplying a signal to the subsea structure from the control console; and
    c. supplying the signal to the ROV and the RTMS via the umbilical.

13. The method of deploying a remotely operated vehicle subsea of claim 12, wherein the signal comprises a power signal and a data communications signal.

14. The method of deploying a remotely operated vehicle subsea of claim 11, further comprising:
    a. configuring the ROV for operations in either a tethered ROV mode or an untethered autonomous underwater vehicle (AUV) mode where the ROV is not coupled to an ROV tether and draws power from the battery skid mounted to the ROV; and
    b. when operating in the AUV Mode, providing the ROV with a predetermined set of pre-programmed mission objectives, the predetermined set of pre-programmed mission objectives comprising:
       i. navigating to a position subsea;
       ii. performing a predetermined function;
       iii. navigating the ROV to the RTMS.

15. The method of deploying a remotely operated vehicle subsea of claim 14, further comprising reconnecting the returned ROV to the ROV tether to return to ROV Mode and recharge the batteries.

16. The method of deploying a remotely operated vehicle subsea of claim 11, further comprising:
    a. allowing the amount of power delivered from the subsea umbilical to the resident system to vary; and
    b. using the actual amount of power delivered from the subsea umbilical to the resident system to determine battery configurations and capacity.

17. The method of deploying a remotely operated vehicle subsea of claim 11, further comprising:
    a. deploying a buoy-based electric power system proximate a location at which the remotely operated vehicle (ROV) subsea is deployed, the buoy-based electric power system comprising:
       i. a surface buoy, comprising:
          1. a housing;
          2. a controller disposed within the housing;
          3. an electric power generator disposed within the housing and operatively in communication with the controller; and
          4. a surface buoy power outlet operatively in communication with the electrical power generator; and
       ii. a battery bank configured for use subsea, comprising:
          1. a housing configured to withstand subsea pressure;
          2. a predetermined set of batteries disposed within the housing;
          3. a subsea battery bank power inlet operatively in communication with the surface buoy power outlet and with the predetermined set of batteries; and
          4. a subsea battery bank power outlet operatively in communication with the predetermined set of batteries;
    b. generating electrical power at the power generator; and
    c. providing the generated electrical power to the electrical power supply or the RTMS power supply.

18. The method of deploying a remotely operated vehicle subsea of claim 17, further comprising using an umbilical disposed intermediate the surface buoy and the subsea docking hub to operatively provide signals to the subsea docking hub.

19. The method of deploying a remotely operated vehicle subsea of claim 18, further comprising allowing control of the ROV from a remote location via communications between the remote location and the ROV through the surface buoy.

* * * * *